Oct. 1, 1968 P. E. HATFIELD ET AL 3,403,895
GAS-SOLID CONTACT DEVICE AND MATERIAL DISCHARGE MEANS
Filed April 3, 1967 5 Sheets-Sheet 1
FIG. 1.
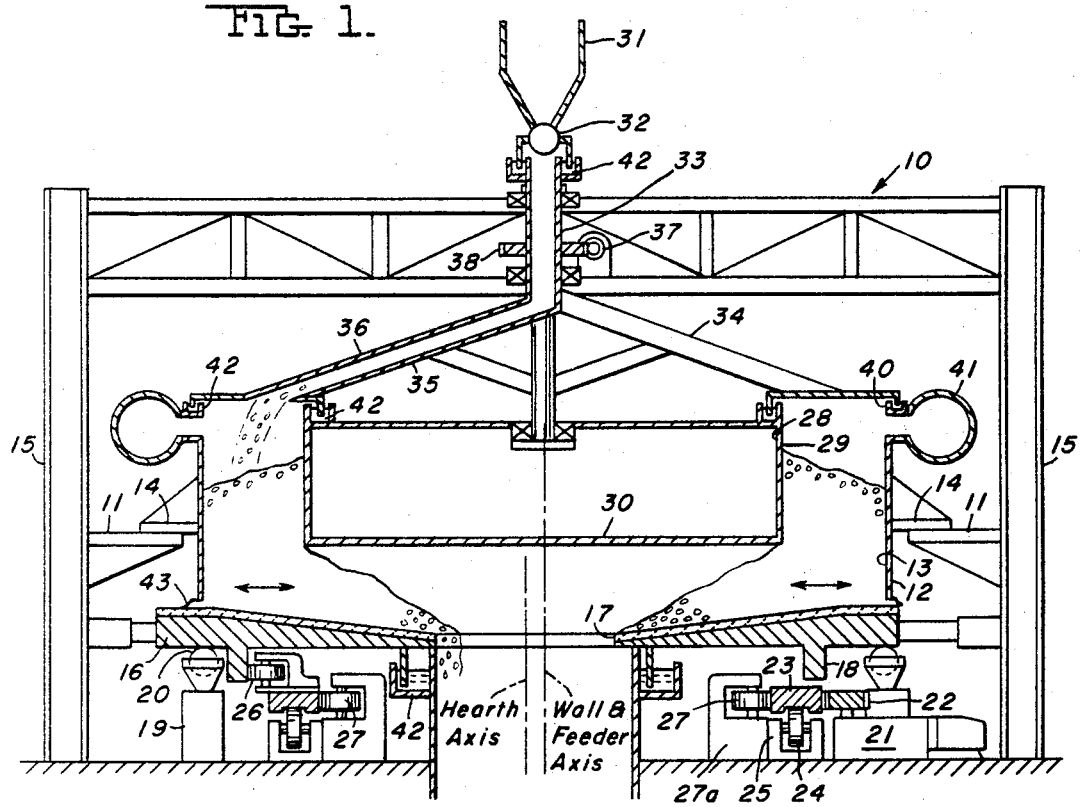
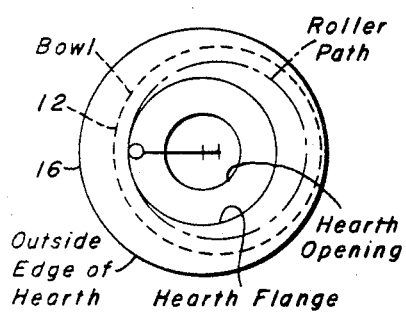
FIG. 2A.
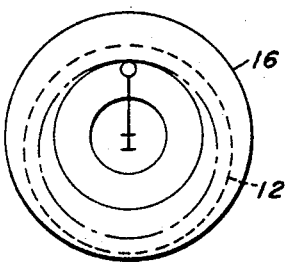
FIG. 2B.
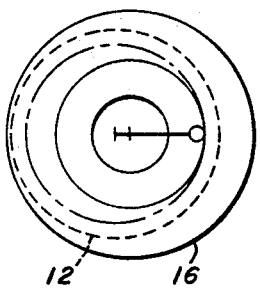
FIG. 2C.
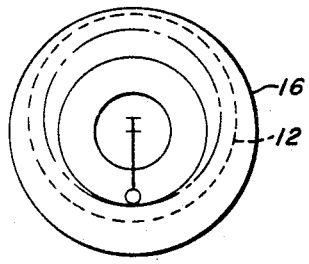
FIG. 2D.
INVENTORS.
PAUL E. HATFIELD and
LOUIS H. JAQUAY
By Christy, Parmelee + Strickland
Attorneys INVENTORS.
PAUL E. HATFIELD and
LOUIS H. JAQUAY Attorneys

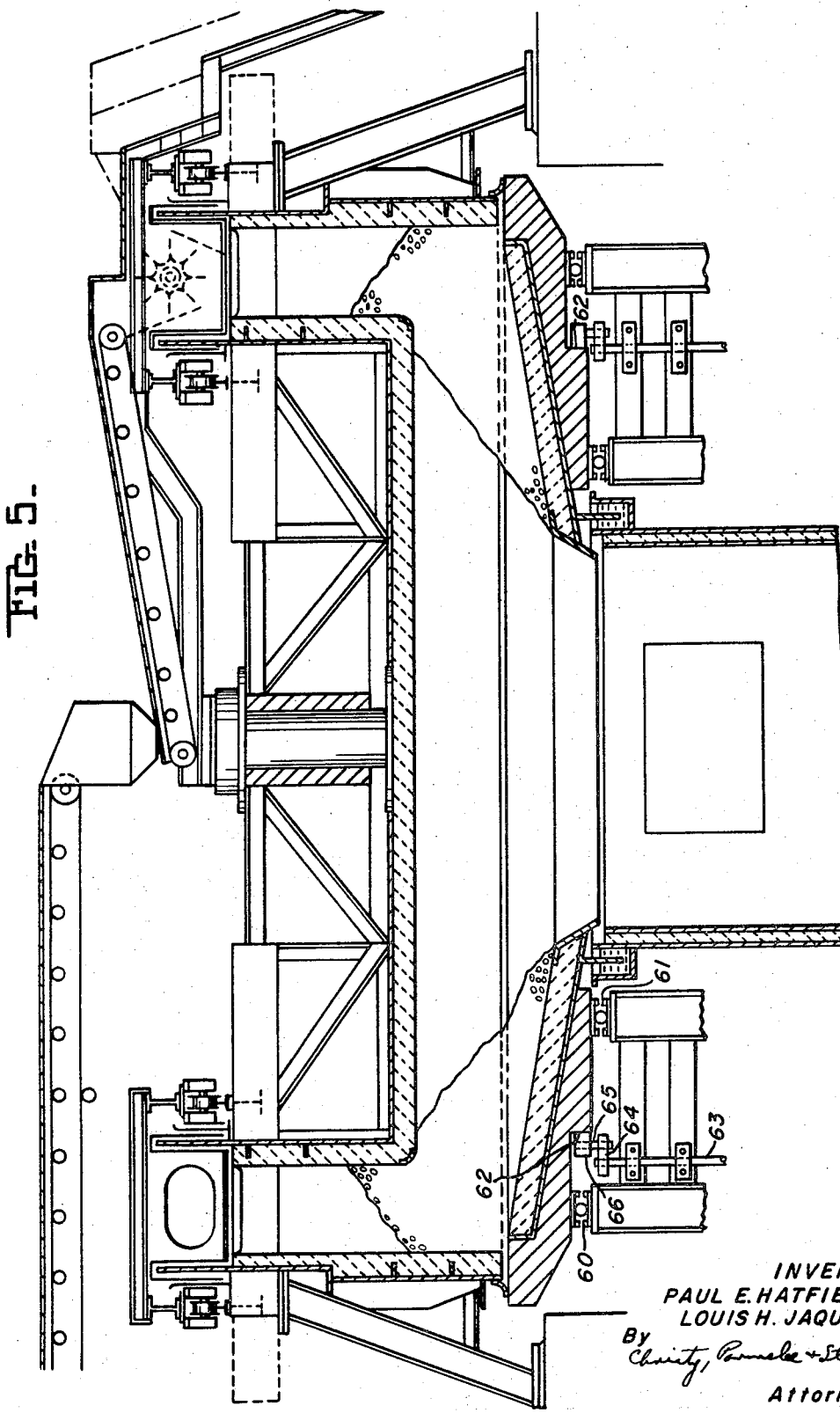

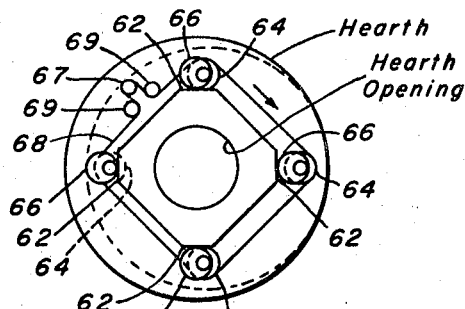
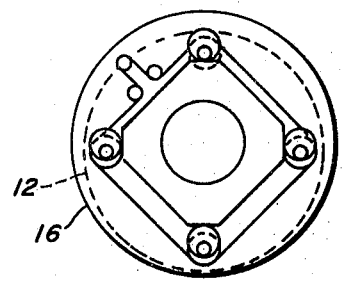
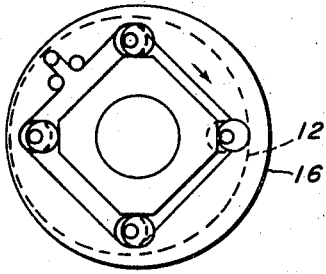
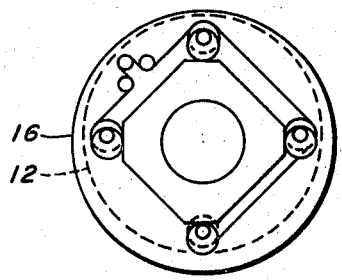
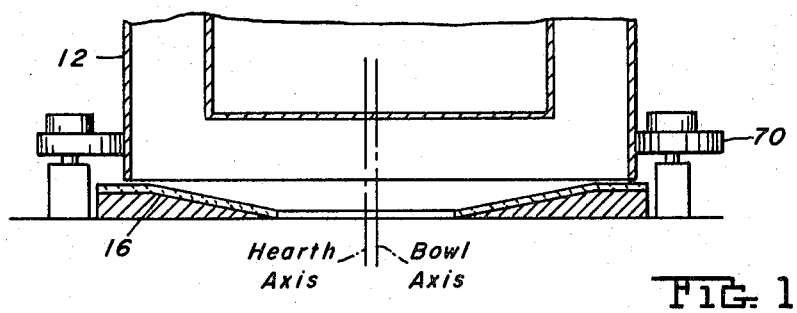
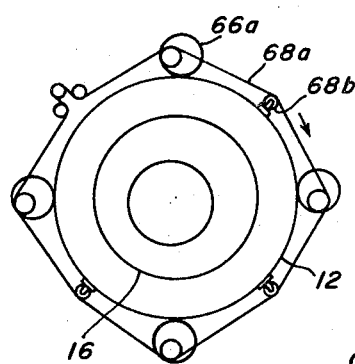
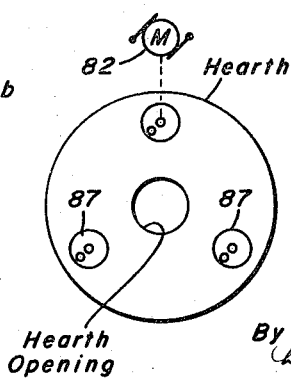
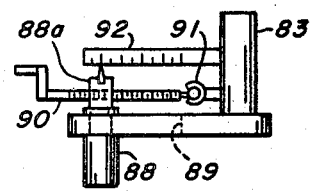
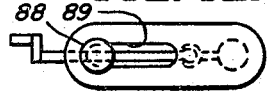
INVENTORS.
PAUL E. HATFIELD and
LOUIS H. JAQUAY

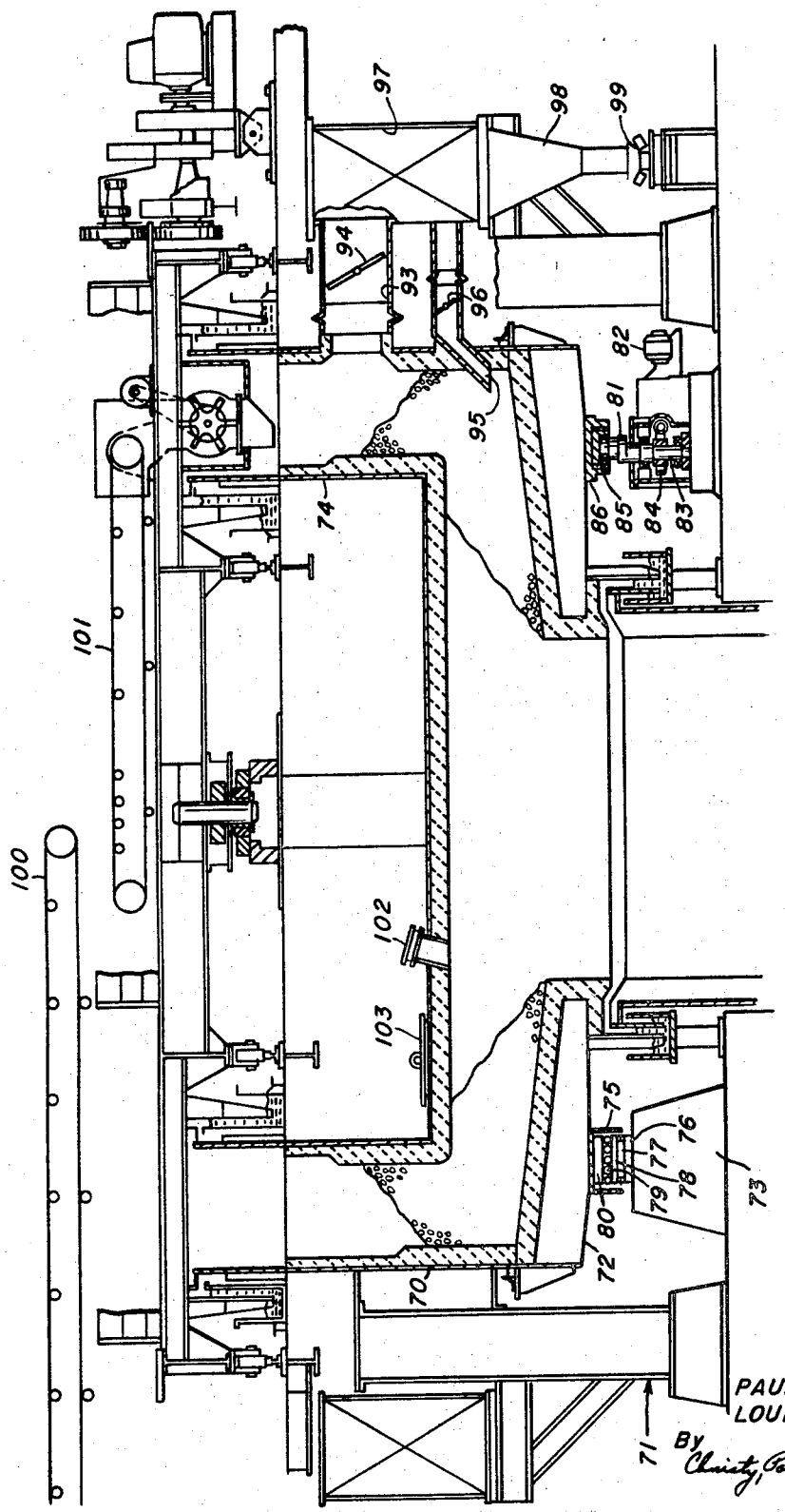

United States Patent Office 3,403,895
Patented Oct. 1, 1968

3,403,895
GAS-SOLID CONTACT DEVICE AND MATERIAL DISCHARGE MEANS
Paul E. Hatfield, Beaver, and Louis H. Jaquay, Bridgeville, Pa., assignors to Dravo Corporation, Pittsburgh, Pa., a corporation of Pennsylvania
Filed Apr. 3, 1967, Ser. No. 627,839
16 Claims. (Cl. 263—29)

ABSTRACT OF THE DISCLOSURE

This invention relates to a gas-solid contact device and particularly to heat exchangers for the temporary containment of solid materials in a gas permeable bed while contacting the solid materials with a gas, and the continuous discharge of solid materials therefrom. The device comprises a hearth member with a central opening therein, a bowl member which surrounds material deposited on the hearth about the central opening, and means for orbiting one of the hearth or bowl members in a manner such that the vertical axis of the orbital member describes a circular path about the vertical axis of the other member, whereby to effect a continuous uniform discharge of material from the hearth through the central opening.

Background of the invention

*Field of the invention.*—This invention relates to a gas-solid contact device and particularly to heat exchangers for the contacting of solid materials with a gas while continuously discharging material from the heat exchanger.

*Description of the prior art.*—Generally, this invention is an improvement on apparatus of the type shown in U.S. Patent No. 2,945,687, to Davis, issued July 19, 1960, and assigned to the Associated Portland Cement Manufacturers, Ltd. Apparatus of this type is useful in the calcining of various materials, in the manufacture of cement clinkers and the heat hardening of "green" pellets of agglomerated metallic ore fines, and generally, is useful in divers applications where a gas-solid contact is desired, and more particularly the apparatus is especially useful in the continuous, as opposed to batch, treating of materials.

In this apparatus as in the prior art, the device comprises basically, an annular hearth member with a central opening, an annular bowl member mounted above the hearth, and means for moving one or the other or both of said members in the manner to effect uniform and continuous discharge of solid materials from the hearth through the central opening. In the prior art, the vertical axis of the bowl and hearth members were laterally offset to effect relative eccentric rotation of the two parts while both parts rotated substantially in step by means of a mechanical coupling therebetween or by means of friction between the material on the hearth and the wall of the bowl. In these devices the drive mechanisms are quite complicated, and consume large amounts of power not only in rotating the large bowl and hearth members but in rotating the many tons of material resident on the hearth.

Summary of the invention

According to the present invention, substantially an eccentric relative movement is effected between the bowl and the hearth but without actually rotating either of these large, heavy members and with less complicated mechanisms and less power consumption. In any given embodiment of the invention only one of the bowl or hearth members need be moved relative to the other. Although both members could be moved, it is not necessary to do so. The motion imparted to the moving member is an orbital motion, i.e., the vertical axis of one member is rotated about the vertical axis of the other member, though neither member is rotated. The bowl and hearth are positioned with their vertical axis offset and one of the members, e.g., the hearth, is progressively reciprocated, while the other, the bowl, remains stationary. A third member is mounted for rotation about the vertical axis of the stationary member while maintaining continuous contact with the movable member, whereby the movable member is progressively laterally or radially displaced relative to the fixed member in a manner such that the vertical axis of the movable member describes a circular locus of points about the vertical axis of the fixed member. This progressive displacement exerts a force by the wall of the bowl member against the material on the hearth to push the material over the edge of the central opening in the hearth. In this manner, material is discharged progressively from all points about the central opening and also the discharge location defines a circular path relative to a fixed point in space, whereas, in the Davis patent cited, the discharge location is fixed relative to a point in space. Where a fixed duct or chute is disposed beneath the central opening the material is discharged evenly around the duct and a better gas-solid contact is achieved.

The rotating member may exert an inwardly or outwardly directed radial thrust against the movable member and preferably is in rolling contact with the movable member to minimize the power requirements and impart a smoother action. Where the hearth is the movable member and thrust is outwardly directed, material discharge will take place at the instantaneous thrust location; where inwardly directed, at a location diametrically opposite the instantaneous thrust location.

In a similar manner the movable member may be reciprocated by a series of spaced cams bearing against the movable member at circumferentially spaced locations and arranged so that the high points of the cams progressively and successively exert a thrust against the movable member whereby its axis is caused to define a circular locus of points about the fixed member to effect a discharge of material progressively from the hearth around the central opening therein.

In another embodiment the desired orbital action is accomplished by means of a series of angularly spaced cam cranks connected to the movable member. At least three cranks are employed only one of which need be driven while the remaining ones may be follower cranks.

An object of the invention is to provide a new and useful gas-solid contact device for the temporary containment of solid materials for contacting the solids with a gas and the continuous discharge of the solid materials.

Another object is to provide a heat exchanger for the contacting of solids with a gas and the continuous uniform discharge of the solids from the heat exchanger.

Brief description of the drawings

These and other objects will be apparent to those skilled in the art and more fully understood by reference to the following description, wherein:

FIG. 1 is a sectional side elevation of a heat exchanger according to one embodiment of the invention; wherein the hearth is the movable member;

FIGS. 2 (*a–d*) are schematic illustrations of the relative movement between the bowl and hearth members of FIG. 1, wherein the hearth is the movable member;

FIG. 5 is a sectional side elevation similar to FIG. 1, but showing a different means for reciprocating the hearth;

FIGS. 6 (a–d) are schematic illustrations of the action of the cams on the hearth of FIG. 5;

FIG. 7 is a sectional side elevation of another embodiment of the invention, wherein the bowl member is reciprocated by a series of cams;

FIG. 8 is a schematic view showing the relation of the cams of FIG. 7;

FIG. 9 is a sectional side elevation of another embodiment of the invention wherein the hearth is reciprocated by means of angularly spaced cranks;

FIG. 10 is a schematic illustration of the arrangement of the cranks of FIG. 9; and FIGS. 11 and 12 are detailed views of an adjustable form of crank suitable for use on the embodiment of FIG. 9.

*Description of the preferred embodiment*

Figure 3:
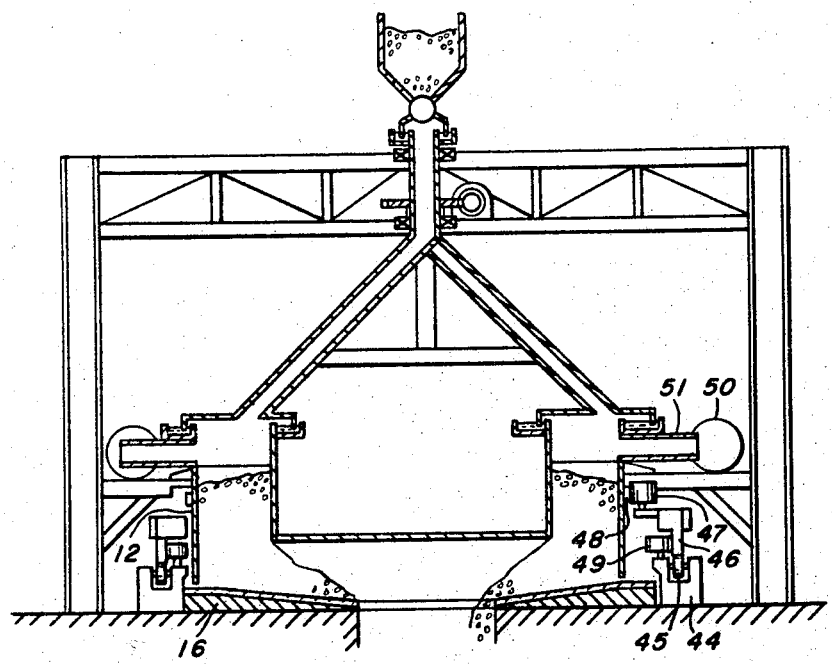
FIG. 3 is a section side elevation of another embodiment of the invention wherein the bowl is the movable member.
Figure 4A:
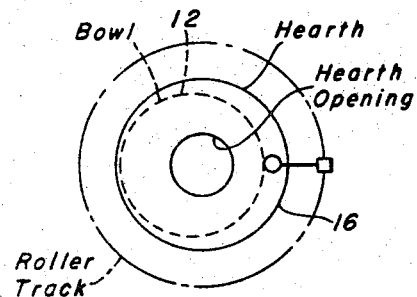
FIGS. 4 (*a–d*) are schematic illustrations of the relative movement between the bowl and hearth of FIG. 3, wherein the bowl is the movable member.
Figure 4B:
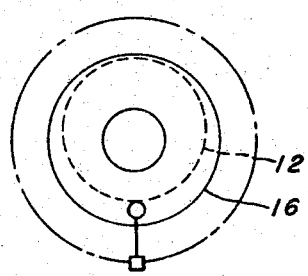
Figure 4C:
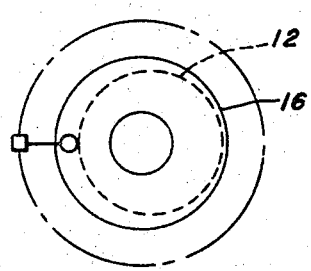
Figure 4D:
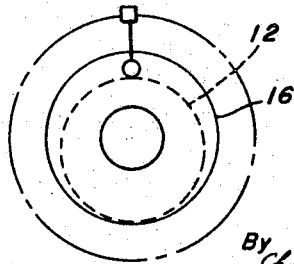

Referring to the drawings and first to FIG. 1, there is a supporting framework 10 with members 11 extending inwardly to form a supporting shelf. The bowl 12 is a generally right cylindrical shaped member with upright side walls 13. Around the exterior of the sidewalls there are supporting plates 14 which rest on the plates 11 to support the bowl. The supporting framework 10 may be comprised of four, six or more upright, uniformly spaced posts 15, each with a plate 11. The bowl 12 has a plurality of corresponding plates 14 for supporting the bowl on the plates 11.

Beneath the bowl 12 there is an annular hearth member 16 having a central circular opening 17 and a depending flange 18 around its underside intermediate the opening 17 and the outer periphery of the hearth. Preferably the upper surface of the hearth is sloped downwardly from a point near its outer periphery toward the central opening to facilitate the flow of materials thereover.

The hearth is supported by means of posts 19 on which are mounted rollers 20 which engage the underside of the hearth in the space intermediate flanges 18 and the outer periphery of the hearth. These posts and rollers are located at suitably spaced intervals around the hearth to form a hearth-supporting roller track with the rollers mounted for universal rotation to minimize friction between the rollers and the hearth.

To reciprocate the hearth in the manner earlier described there is provided a motor 21 which drives a gear 22 which meshes with the teeth of a rotatable annulus 23 supported by idler rollers 24 which are mounted on a U-shaped annulus 25. Mounted on the annulus 23 there is a roller 26 which bears against the inner face of flange 18. The axis of rotation of the annulus 23 corresponds to the geometric vertical axis of the fixed bowl 12. The geometric vertical axis of the hearth 16 is horizontally spaced from the axis of rotation of the annulus 23. From this it will be seen that as the annulus 23 is rotated the roller 26 bearing against the flange 18 will progress around the inner face of the flange and in so doing will cause the geometric axis of the hearth to rotate about the vertical axis of the bowl which is stationary. Stated differently the vertical axis of the hearth will describe a circular locus of points about the vertical axis of the bowl. In this fashion there is effected a relative eccentric movement between the bowl and the hearth whereby material deposited on the hearth in the manner shown will be continuously and progressively discharged through the central opening in the hearth by the relative movement of the hearth with respect to the stationary sidewalls 13 of the bowl 12. Annulus 23 is confined to a fixed circular path of rotation by means of idler rollers 27 mounted on supports 27a so that the rollers bear against the inner diameter surface of annulus 23 at suitably spaced intervals therearound to take up the thrust and maintain annulus 23 in a fixed track.

To feed material onto the hearth the bowl is provided with an inner bowl 28 whose sidewalls 29 are spaced from the sidewalls of the bowl 12 to provide an annular opening between the sidewalls 29 and 13. Bowl 28 also has a bottom 30 spaced above the hearth 16 to confine the upward flow of gases to the space between the inner and outer bowl sidewalls. Material is fed from hopper 31 through a rotary valve 32 down through a tube 33 at the lower end of which is mounted hood 34 which has spaced inner and outer walls 35 and 36 at one location to define a passageway whereby material flowing from tube 33 may enter and flow through the passageway to the space between the sidewalls 13 and 29 and be deposited onto the hearth 16. Tube 33 and the hood 34 are together rotated by motor 37 which drives a gear 38 fixed to tube 33. In this manner materials from the hopper are uniformly distributed around the hearth by the rotation of the hood 34.

39 is a chute or duct which communicates with the hearth central opening and conducts gases from some source such as a rotary kiln (not shown) upwardly through the central opening through the material on the hearth thence out through annular opening 40 around the top of the bowl outer sidewall 13 to a bustle pipe 41 to which may be connected an exhaust fan or the like (not shown) to carry away the waste gases.

To seal the heat exchangers from the escape of gases and the ingress of ambient air there is provided a series of annular water seals 42 to seal the hearth to the duct 39, to seal the hood 34 to the bowl 12 and to seal the tube 33 to the hopper 31. Such seals which may contain sand or the like as well as water, are well-known in the art and need not be further explained.

At the lower edge of the sidewalls of the bowl, in the small space between the bowl and hearth, there is a suitable annular seal 43, such as an asbestos seal, to restrict the escape of gases passing through the heat exchanger. A water seal 42 may also be used in lieu of an asbestos seal for this purpose.

FIG. 2a to d schematically illustrate the action of the apparatus of FIG. 1. As per the legends on the drawings, the hearth is in solid lines, the bowl in dashed lines, and the roller path in intermittent dash lines. Relative sizes of the bowl and hearth and the proportional amount of offset of the axes of bowl and hearth is exaggerated for clarity of illustration. In an actual embodiment the bowl and hearth may be on the order of 20–40 feet in diameter and the offset between the axes thereof may be on the order of 3 to 6 inches for satisfactory operation. The degree of offset depends upon a number of factors such as the gas temperature, the material being treated, particle size, and desired residence time, to name a few important variables. In the drawings the hearth is shown in four different positions, 90° apart with respect to the rotation of roller 26. As will be seen from the drawings, as roller 26 is rotated clockwise from the position shown in FIG. 2a through a complete 360° cycle, the axis of hearth 16 is caused to describe a circular path about the axis of bowl 28. Material is thereby continuously discharged from the hearth around the central opening at the point of minimum radial distance between the bowl sidewall and the central opening in the hearth. This point of minimal distance will be seen to progress around the hearth as the roller 26 traverses its circular path, whereby material will be discharged continuously and uniformly around the central opening.

FIG. 3 is another embodiment of the invention utilizing the same principle of an offset rotating roller but bearing against the bowl member whereby the bowl is moved relative to a stationary hearth. In this embodiment the hearth is stationary and rests on any suitable supporting surface. Around the hearth there is a U-shaped annulus 44 on which are mounted a plurality of idler rollers 45. Resting on the rollers 45 there is a toothed annulus 46 which meshes with a suitable driving gear (not shown) to rotate the annulus. Carried by annulus 46 there is a roller 47 which bears against the outer wall of the bowl 12, preferably against a suitable bearing surface on the outer periphery of the bowl such as annular roller track 48. The center of rotation of annulus 46 and therefore of roller 47 is laterally offset from the geometric axis of the hearth and hearth central opening, whereby as the roller 47 progresses around the bowl, the bowl sidewalls are moved radially inward with respect to the hearth at progressive locations around the hearth. This relative displacement affects discharge of material from the hearth at the position whereat the roller 47 bears against the bowl. Thrust rollers 49 are provided to maintain annulus 46 in a fixed track around the bowl. In this embodiment the geometric axis of the bowl orbits about the geometric axis of the hearth in the same manner as the hearth axis orbited the geometric axis of the bowl in the embodiment earlier described. Substantially the same feed mechanism is employed in this embodiment as was earlier described. It will be understood however that the annular water seals 42 will be sufficiently wide to permit the necessary lateral displacement of the bowl. Also in FIG. 3 there is a bustle pipe 50 through which gases passing through the bed of material are exhausted. However, because of the movement of the bowl, the bowl is provided with a radially extending, annular, gas exhaust duct 51 therearound, slidably communicating with the bustle pipe. The duct 51 must be of sufficient radial dimension to maintain communication with the bustle pipe which is fixed.

FIGS. 4a–d schematically illustrate the relative movement of the bowl and hearth of FIG. 3. The drawings show the roller 48 in clockwise rotation at four successive positions 90° apart. It will be seen that discharge of materials takes place at the location whereat the roller is bearing against the bowl.

Referring to FIG. 5 there is shown another embodiment of the invention. The apparatus is similar to that shown in FIG. 1 however the hearth is here supported on a series of bearing pads 60 and 61. Three or more bearing pads around the hearth are adequate, however, it is preferred to use three or more of each of the radially spaced pads 60 and 61. On the underside of the hearth intermediate the bearing pads, the hearth is provided with a series of circumferentially spaced shoulders 62 to provide a vertical bearing surface against which the later described cams may bear in order to move the hearth relative to the bowl. Shoulders 62 thus function in essentially the same manner as depending flange 18 of FIG. 1. In the illustrated embodiment as best seen in FIGS. 6a to 6d there are four such shoulders 62 spaced 90° apart. At each 90° location there is a rotating vertical axle 63 having mounted thereon the circular cam carrier 64. Spaced from each axle 63 and from the center of cam carrier 64 there is a vertical pin 65 on which is mounted roller 66 which bears against the shoulder 62 on the hearth and acts as a cam as axle 63 is rotated. It will be seen that as the axle 63 is rotated by any suitable means (not shown) the cam carrier 64 will carry roller 66 through a circular path which is offset from the axle 63, i.e., the roller or cam 66 will tend to rotate toward and away from the shoulder 62, whereby the combination of carrier 64 and roller 66 acts as a cam.

The operation of this embodiment is best illustrated by reference to FIGS. 6a–d. The bowl and hearth are initially positioned so that their vertical axes are offset, and, as illustrated in FIG. 6a, the cams 66 are initially positioned with their high point or point of maximum throw of each cam lagging the preceding cam by 90° progressing around the hearth in the direction of cam rotation. In FIGS. 6a–d the cams are rotated clockwise by means of a driving pulley or sprocket 67 and a chain or belt 68 operatively connected to the cams. Idler rollers or sprockets 69 maintain the belt or chain 68 in tension to maintain the rotation of the cams in timed relation. The hearth is shown in solid lines, and the bowl in dashed lines in FIGS. 6a–d.

Assuming a starting position as shown in FIG. 6a, cams 66 are shown in a position whereat the hearth is displaced to the left by the maximum amount. In FIG. 6b the cams have rotated clockwise 90° to a position whereat the hearth is displaced the maximum amount toward the lower edge of the drawing as viewed in said FIG. 6b. In like manner as the cams are continuously rotated the hearth will be continuously displaced in a manner such that the central axis of the hearth will describe a circular locus of points about the stationary geometric axis of the bowl. In the embodiment it will be seen that the thrust of the cams is directed radially inward whereby discharge from the hearth takes place at a location diametrically opposite the point at which the cam is exerting the thrust.

FIG. 7 shows still another embodiment of the invention wherein a plurality of cams 66a are rotated in timed relation as in the embodiment just described, but the cams 66a bear against the outer periphery of the bowl to reciprocate the bowl relative to the hearth. The cams in this embodiment arealso mounted 90° apart and are prepositioned such that the maximum throw of the cams are also 90° apart, i.e., as viewed in FIG. 8, the maximum throw of each cam lags the preceding cam by 90°. The cams are also linked with a suitable timing chain 68a to maintain the preestablished relationship. In this embodiment the geometric axis of the bowl is orbited around the geometric axis of the hearth to effect the discharge of material in the same manner as heretofore described in connection with FIG. 3. Idlers 68b maintain the chain 68a in spaced relation to the bowl.

FIG. 9 is similar to FIG. 5, and showns the preferred embodiment of the invention. The apparatus of FIG. 9 is substantially the same as that of FIG. 5 except as hereafter described.

There is a bowl 70 which is the stationary member, mounted on a suitable support indicated generally at 71. Hearth 72 is the movable member in this embodiment mounted on suitable support posts, one of which is indicated at 73. The hearth has a refractory lined bed and a central opening as before, and the bowl likewise is refractory lined and has a central interior bowl 74 to define an annular passage between the inner and outer bowls for the flow of material.

The hearth is supported on universal roller bearing assemblies 75 which are known in the art, but generally each bearing assembly comprises a sort of sandwich arrangement with a bottom bearing plate 76 mounted on post 73, a first set of rollers 77 arranged with their axes parallel to each other, an intermediate bearing plate 78, a second set of rollers 79 arranged with their axes parallel to each other but at right angles to the first set of rollers, and an upper bearing plate mounted on the underside of hearth 72. Thereis also a housing 80 with sidewalls spaced from the rollers and bearing plates to permit movements of the latter. A plurality of assemblies 75 are arranged around the underside of the hearth to support it at angularly spaced locations. The described bearing permits movements of the hearth in all horizontal directions.

The hearth is moved in a manner as before described by means of a plurality of cranks connected to and angularly spaced about the hearth. One of these cranks, the driven crank is indicated at 81 on the lower right hand side of FIG. 9. Motor 82 drives the crank shaft 83 by means of gear 84. The upper end of the crank 81 is fitted into a bearing 85 mounted on the undeside of hearth 72 in a housing 86.

As seen in FIG. 10, a plurality of other cranks 87 are angularly spaced about the hearth the same radial distance from the center line of the hearth as crank 81. Cranks 87 are identical with crank 81 in construction and manner of connection to the hearth, however, cranks 87 need not be driven and preferably are not driven, i.e., they are idler cranks, in order to reduce the number of motors and the necessary gearing.

If at least two idler cranks are provided with one driven crank the idler cranks will rotate in unison with the driven crank, so long as the cranks are not all in a straight line alignment, i.e., the cranks must define a triangle. Preferably the cranks are equiangularly spaced, the angle being 120° as shown when three cranks are employed, one drive crank and two idler cranks.

When the drive crank is rotated the axis of the hearth will orbit in a circle having a radius equal to the length of the crank area. The other cranks, being connected to the hearth, will rotate in the same manner and confine the hearth to the predetermined orbital path.

The discharge note of material from the hearth depends upon the speed of orbiting of the hearth, i.e., upon the rate of revolution of the cranks, and on the radius of the orbit, i.e., the length of the crank arm. The speed of orbiting is controllable by controlling the speed of motor 82 and/or the reduction gearing between motor 82 and gear 84. The effective length of the crank arms can be readily varied as seen in FIG. 11, which shows one embodiment of a crank with an adjustable pin 88. Pin 88 is slidable in slot 89 by means of adjusting screw 90. Screw 90 is threaded through an extension 88a of pin 88 and has a ball and socket connection 91 at one end. 92 is an indicator to facilitate the positioning of all the cams. Pin 88 is insertable in the bearing 85 and rotatable by means of a crank shaft 83 as before described.

A plurality of water seals are also provided and the interface between the bowl and hearth is provided with suitable sealing means such as an asbestos seal, in the manner described in connection with FIG. 1.

To control gas flow through the bed of material on the hearth there are a plurality of angularly spaced off-take ducts, one of which is indicated at 93 spaced around the upper part of the bowl. In each duct there is a flow control damper 94. There are also a plurality of angularly spaced off-take ducts around the bowl adjacent the hearth, one such duct being indicated at 95. This duct is smaller than the upper off-take ducts and is also provided with a flow control damper 96. Both upper ducts 93 and lower ducts 95 discharge to a common bustle pipe 97 or the like which is provided with a dust trap 98 which collects and discharges dust particles onto a conveyor 99 moving therebelow.

In the embodiment shown in FIG. 9 there is also a material conveying system comprsing a main feed belt 100 and distribution feed belt 101, which latter belt is rotatable in a manner aforedescribed to distribute the material evenly around the hearth.

Other features of the apparatus of FIG. 9 include a sight hole 102 and access hatch 103 in the wall of inner bowl 74.

In FIG. 9 the center lines of both the bowl and hearth are shown in alignment, as they properly can be. The orbital path of the hearth axis will then describe a locus of points defining a closed arcuate path, substantially all points of which are spaced from the axis of the bowl, i.e., once in each orbit the hearth and bowl axes will coincide. If the axes are initially offset and a circular orbit imparted to the hearth the action will be described in connection with FIG. 1.

The vertical axis of the orbiting member can be made to follow diverse non-circular orbits where special considerations warrant a particular discharge pattern. Generally, however, the circular orbit is suitable for most applications.

Having described several embodiments of the invention, it will be apparent to those skilled in the art that variations and modifications are possible within the scope and spirit of the invention.

We claim:

1. Apparatus for the temporary containment of a solid particulate material during contacting of the solids with a gas, and the continuous discharge of the material therefrom, comprising:
    (a) a horizontally disposed base member having a central opening therein and upon which the material is deposited around the central opening,
    (b) an upper member, positioned above and supported independently of the base member, having vertical side walls surrounding the deposited material,
    (c) each of the members having a vertical axis, and
    (d) means for horizontally reciprocating one of the members in a manner such that its vertical axis in the plane of the base member describes a locus of points defining a closed arcuate path, substantially all points of which are spaced from the axis of the other member, whereby there is effected a relative horizontal movement between the members effecting discharge of the material from the base member through the central opening.

2. Apparatus as defined in claim 1, wherein the base member is horizontally reciprocated while the upper member is held stationary.

3. Apparatus as defined in claim 2, wherein the vertical axis of the base member and upper member are horizontally spaced, the base member includes a depending flange on its underside forming a circular vertical abutment surface concentric with the central opening, the flange being spaced radially outward from the central opening, and wherein the means for horizontally reciprocating the base member comprises:
    (a) a roller in rolling contact with the vertical abutment surface of the flange,
    (b) track means confining the roller to a path concentric with the axis of the upper member, and
    (c) means for rotating the roller on the track while contacting the abutment surface, whereby the vertical axis of the base member describes a circular orbit about the vertical axis of the upper member.

4. Apparatus as defined in claim 3, wherein the flange has inner and outer abutment surfaces and the roller bears against the outer surface.

5. Apparatus as defined in claim 3, wherein the flange has inner and outer abutment surfaces and the roller bears against the inner surface.

6. Apparatus as defined in claim 2, wherein the means for horizontally reciprocating the base member comprises:
    (a) abutment surfaces at angularly spaced locations around the base,
    (b) a series of cams bearing against the abutment surfaces, and
    (c) means for rotating the cams in timed relation to effect a continuous progressive reciprocation of the base member in a manner such that the vertical axis of the base defines a closed arcuate path around the vertical axis of the upper member.

7. Apparatus as defined in claim 2, wherein the means for reciprocating the base member comprises:
    (a) a plurality of crank shafts, at angularly spaced locations around the base,
    (b) a crank arm connected to each shaft,
    (c) a pin connected to each crank arm and to the base, and
    (d) means for rotating at least one of the crank shafts.

8. Apparatus as defined in claim 7 including means for adjusting the effective length of the crank arms.

9. Apparatus as defined in claim 7 including at least three crank shafts and wherein the three are arranged such that the points of connection of the pins with the base define a triangle.

10. Apparatus as defined in claim 1, including:
    (a) an inner bowl member having a bottom and side walls, the side walls being spaced from the side walls of the upper member, the bottom being spaced above the base member, whereby to define an annular space for the flow of gases through the material on the base and a space wherein to retain materials for deposition onto the base,
    (b) a rotatable hood sealingly surrounding the annular space at the top thereof,
    (c) material feed means rotatable with the hood, whereby material is deposited into the annular space and onto the base member, (d) means for rotating the hood, and (e) gas exhaust means communicating with the annular space.

11. Apparatus as defined in claim 10 wherein the diameter of the inner bowl member is greater than the diameter of the central opening in the base member.

12. Apparatus as defined in claim 10 wherein the gas exhaust means comprises:

(a) a first exhaust duct communicating with the annular space above the level of materials deposited therein, (b) a second exhaust duct communicating with the annular space below the level of materials deposited therein.

13. Apparatus as defined in claim 12 including flow control means in each of the first and second exhaust ducts for selectively controlling the flow of gases.

14. A heat exchanger for the temporary containment of a gas permeable bed of materials and the continuous discharge of materials therefrom while contacting the bed with a gas, comprising:

(a) a hearth member having a central opening therein and upon which materials are deposited in a bed around the central opening, (b) a stationary bowl member having vertically extending side walls surrounding the bed, (c) an inner bowl member having side walls spaced from the outer bowl and a bottom spaced above the hearth whereby to define an annular space within which the material is deposited, the diameter of the inner bowl being greater than the diameter of the hearth central opening whereby material may flow downwardly in the annular space, thence radially inward toward and through the central opening, (d) means for feeding materials into the annular space and onto the hearth, and (e) means for effecting a progressive horizontal displacement of the hearth relative to the side walls of the outer bowl in a manner such that any point on the hearth defines a closed arcuate path, whereby material on the hearth is urged toward and through the hearth central opening.

15. Apparatus as defined in claim 14 wherein the vertical axes of the outer bowl and the hearth are horizontally offset and the axis of the hearth orbits the axis of the outer bowl.

16. Apparatus as defined in claim 14 wherein the progressive horizontal displacement of the hearth is effected by the continuous application on the hearth of a net resultant force acting in a direction radial to the hearth and which direction is caused to continuously change throughout an arc of 360°.

References Cited
UNITED STATES PATENTS

| | | | |
|---|---|---|---|
| 1,429,925 | 9/1922 | Candlot | 263—29 |
| 2,785,885 | 3/1957 | Mohrs et al. | 263—29 |
| 3,360,249 | 12/1967 | Trumbo et al. | 263—29 |

JOHN J. CAMBY, *Acting Primary Examiner.*